(12) United States Patent
Wylde et al.

(10) Patent No.: US 8,152,402 B2
(45) Date of Patent: Apr. 10, 2012

(54) FLEXIBLE PERIPHERAL DEVICE POSITIONER

(75) Inventors: William R. Wylde, Shenzhen (CN); KeLong Zhao, Shenzhen (CN)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 12/115,547

(22) Filed: May 6, 2008

(65) Prior Publication Data

US 2009/0279943 A1 Nov. 12, 2009

(51) Int. Cl.
*F16M 13/00* (2006.01)

(52) U.S. Cl. ............ 403/54; 403/62; 403/291; 248/528; 248/910

(58) Field of Classification Search .................... 403/53, 403/54, 62, 185, 269, 224, 291; 248/284.1, 248/308, 528, 160, 442.2, 468, 910; 16/366, 16/368, 369, 370, 372, 250; 349/58; 362/427, 362/432
See application file for complete search history.

(56) References Cited

U.S. PATENT DOCUMENTS

| | | | | |
|---|---|---|---|---|
| 938,998 A * | 11/1909 | Evans | ............................. | 248/308 |
| 1,751,198 A * | 3/1930 | Franck | ........................... | 248/308 |
| 2,565,719 A * | 8/1951 | Church | ........................... | 248/215 |
| 2,820,669 A * | 1/1958 | Lowe | ............................... | 16/369 |
| 3,600,080 A | 8/1971 | Czernik et al. | | |
| 3,651,540 A * | 3/1972 | Rana | ................................ | 16/251 |
| 4,630,333 A | 12/1986 | Vickers | | |
| 4,757,905 A * | 7/1988 | Green | ............................... | 211/31 |
| 4,773,395 A * | 9/1988 | Suzuki et al. | ................... | 600/142 |
| 5,441,499 A * | 8/1995 | Fritzsch | ........................... | 606/45 |
| 5,697,594 A * | 12/1997 | Adams et al. | ............... | 248/444.1 |
| 5,749,634 A | 5/1998 | Wiesner et al. | | |
| 5,771,540 A | 6/1998 | Carpenter et al. | | |
| D411,220 S * | 6/1999 | Surabian | ........................ | 396/428 |
| 6,203,175 B1 * | 3/2001 | Basacchi | ........................ | 362/287 |
| 6,345,796 B1 * | 2/2002 | Neuman | ........................ | 248/308 |
| 6,393,662 B1 | 5/2002 | Huang et al. | | |
| D498,251 S * | 11/2004 | Invencio | ........................ | D16/242 |
| 7,124,988 B1 * | 10/2006 | Duffy et al. | ................. | 248/284.1 |
| 7,182,347 B2 | 2/2007 | Erdman | | |
| 7,618,202 B2 * | 11/2009 | Xiao et al. | ...................... | 396/428 |
| 7,644,900 B2 * | 1/2010 | Yap et al. | ......................... | 248/304 |
| 2004/0016714 A1 | 1/2004 | Wood et al. | | |
| 2004/0115420 A1 * | 6/2004 | Schoemann | ................ | 428/317.9 |
| 2006/0231700 A1 | 10/2006 | Orf et al. | | |
| 2007/0019941 A1 | 1/2007 | Cross et al. | | |
| 2007/0136992 A1 | 6/2007 | Lu et al. | | |

OTHER PUBLICATIONS

"Torque Hinge & Torque Hinges Products", Hanaya Corporation, 2008, pp. 2.
"Hinges", Outwater Plastics Industries, 2007, pp. 2.
"Shepherd Plastic Hinges", CEShepherd.com, 2005-2006, pp. 2.

* cited by examiner

*Primary Examiner* — Michael P Ferguson
(74) *Attorney, Agent, or Firm* — Alleman Hall McCoy Russell & Tuttle LLP

(57) ABSTRACT

A peripheral positioner includes a plurality of links that are rotatably coupled to one another. The peripheral positioner can be used to position a peripheral device on various surfaces and/or objects.

5 Claims, 8 Drawing Sheets

FLEXIBLE PERIPHERAL DEVICE POSITIONER

BACKGROUND

Modern-day personal computing has witnessed the advent of the use of accessories, or "peripherals," that add functionality and/or enjoyment to a personal computing experience. For example, the modern-day personal computer user may utilize a web-cam, hand-held personal data assistant, or digital music playing device to directly or indirectly enhance or add functionality to their personal computing experience.

The user experience can be affected by the ease with which peripheral electronic devices can be positioned with respect to a computer keyboard, a computer monitor, a computer mouse, and/or the computer user. For example, at some point during a user session, a user may desire to position a web-cam on the surface of a desk that a monitor is resting upon and at another point during the session the user may desire to position the web-cam along a top surface of the monitor. Additionally, a user may desire to position an electronic device on an un-even or non-uniform support surface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A peripheral positioner is disclosed. The peripheral positioner can be used to position a peripheral device on various surfaces and/or objects. The peripheral positioner includes a plurality of links that are rotatably coupled to one another.

DETAILED DESCRIPTION

A peripheral positioner is disclosed. The peripheral positioner can be configured to position a variety of different peripherals for a variety of different uses. As a non-limiting example, a peripheral positioner can be used to position a web-cam. A web-cam may be used in conjunction with a personal computing system to capture video images that are then received electronically by the computing system. The ability to position the web-cam at multiple filming vantage points and/or filming angles may enrich and add functionality to web-cam usage and can also improve the ergonomic interrelationship between a personal computing system user, a peripheral electronic device, and a personal computing system. Although described herein with reference to a web-cam, it should be appreciated that the peripheral positioner of the present disclosure may be used in conjunction with other electronic devices such as a hand-held personal data assistant, a digital music playing device, or a stereo speaker, for example. Furthermore, in some embodiments, multiple peripheral electronic devices may be positioned with the peripheral positioner of the present disclosure.

Figure 1:
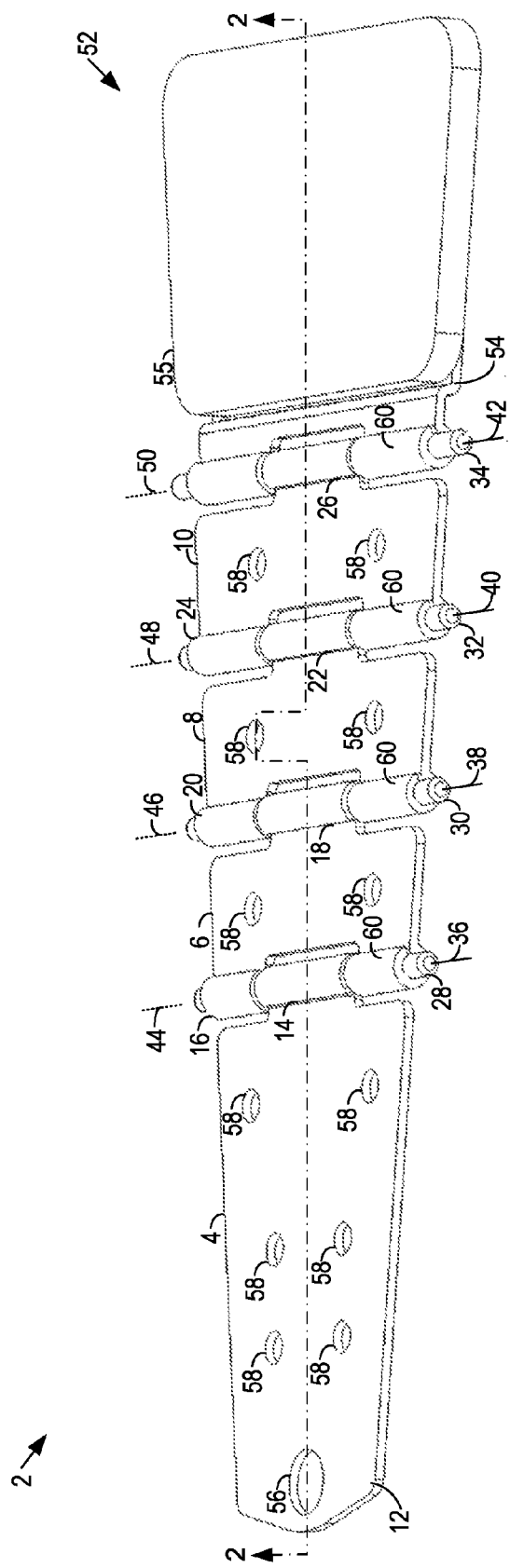
FIG. 1 shows a skeleton of a peripheral positioner for positioning a peripheral electronic device according to an embodiment of the present disclosure.

FIG. 1 shows a skeleton 2 of a peripheral positioner for positioning a peripheral electronic device. Skeleton 2 may include a first link 4, a second link 6, a third link 8, and a fourth link 10. Although shown in FIG. 1 as including four links, other embodiments may include only three links, five links, six links, or another suitable number of links. First link 4, second link 6, third link 8, and fourth link 10 may be substantially flat and generally trapezoidal in shape. Furthermore, first link 4, second link 6, third link 8, and fourth link 10 may be configured such that the collective shape of the skeleton formed by the individual links is generally trapezoidal. When configured as such, the general trapezoidal shape of skeleton 2 may enhance the stability of the skeleton when a peripheral electronic device is attached thereto. However, the links, and/or the collective shape formed by the links may be shaped differently in other embodiments.

First link 4 may include a first end 12 and a second end 14. Likewise, second link 6 may include a first end 16 and a second end 18, third link 8 may include a first end 20 and a second end 22, and fourth link 10 may include a first end 24 and a second end 26.

Skeleton 2 may further include first pin 28, second pin 30, third pin 32, and fourth pin 34. First pin 28 has a longitudinal axis 36. Likewise, second pin 30 has a longitudinal axis 38, third pin 32 has a longitudinal axis 40, and fourth pin 34 has a longitudinal axis 42.

First pin 28 may rotatably couple second end 14 of first link 4 to first end 16 of second link 6 such that a rotation axis 44 of the first link and the second link is constrained to remain substantially parallel to longitudinal axis 36 of the first pin. Additionally, the first link may be rotatably coupled to the second link such that the first link is rotatable through a range of at least 270 degrees relative to the second link.

Second pin 30 may rotatably couple second end 18 of second link 6 to first end 20 of third link 8 such that a rotation axis 46 of the second link and the third link may be constrained to remain substantially parallel to longitudinal axis 38 of second pin 30, rotation axis 44 of first link 4 and second link 6, and longitudinal axis 36 of first pin 28. Second link 6 may be rotatably coupled to third link 8 such that the second link is rotatable through a range of at least 270 degrees relative to the third link.

Third pin 32 may rotatably couple second end 22 of third link 8 to first end 24 of fourth link 10 such that a rotation axis 48 of the third link and the fourth link may be constrained to remain substantially parallel to longitudinal axis 40 of third pin 32, rotation axis 44 of first link 4 and second link 6, rotation axis 46 of second link 6 and third link 8, longitudinal axis 36 of first pin 28, and longitudinal axis 38 of second pin 30. Third link 8 may be rotatably coupled to fourth link 10 such that the third link is rotatable through a range of at least 270 degrees relative to the fourth link.

Skeleton 2 may further include weighted link 52. Weighted link 52 may be configured to be heavier than either the first link, the second link, the third link, or the fourth link. Weighted link 52 may include a base link portion 54 that is similar in general shape and thickness as first link 4, second link 6, third link 8, and fourth link 10 (i.e., generally trapezoidal and generally flat). Weighted link 52 may include weight portion 55 that may be heavier than first link 4, second link 6, third link 8, fourth link 10, or base link portion 54. Base link portion 54 may be mechanically coupled to weight portion 55. For example, weight portion 55 may be riveted, adhesively bonded to, or otherwise mechanically fastened to base link portion 54. In other embodiments, weighted link 52 may be configured as a monolith that is heavier than either the first link, the second link, the third link, or the fourth link.

Fourth pin 34 may rotatably couple second end 26 of fourth link 10 to weighted link 52 such that a rotation axis 50 of the fourth link and the weighted link may be constrained to remain substantially parallel to longitudinal axis 42 of fourth pin 34, rotation axis 44 of first link 4 and second link 6, rotation axis 46 of second link 6 and third link 8, rotation axis 48 of third link 8 and fourth link 10, longitudinal axis 36 of first pin 28, longitudinal axis 38 of second pin 30, and longitudinal axis 40 of third pin 32.

As described above, first link 4, second link 6, third link 8, fourth link 10, and weighted link 52 are coupled such that they may rotate with respect to at least one rotation axis that is shared with an adjacent link. As such, a plurality of links and pins collectively form a skeleton 2 that can be used to position a peripheral electronic device on or to a multitude of objects. A user can rotate at least one of the links with respect to an adjacent link such that they collectively cooperate to form another configuration, different from the configuration illustrated in FIG. 1. For example, the links forming skeleton 2 may be manipulated such that a C-shape or a pinching configuration is collectively formed (described in further detail with regards to FIG. 4, FIG. 5, and FIG. 6) by the skeleton.

Skeleton 2 may be configured to substantially maintain a desired configuration into which a user positions the various links. For skeleton 2 to substantially maintain a desired configuration, a resistance to rotation between adjacent links may be employed. For example, second link 6 may be rotatably coupled to first link 4 about a first axis of rotation with sufficient rotational interference to hold the second link in a fixed position relative to the first link. In other words, an interface between the first link 4, the second link 6, and the first pin 28 may have sufficient rotational interference to hold the second link in a fixed position relative to the first link even when under a load from a peripheral device. As non-limiting examples, in some embodiments, rotational interference may be achieved via a frictional interference fit between a link and a pin coupled thereto, or a spring force implemented between a link and a pin coupled thereto.

As with first link 4 and second link 6, third link 8 may be rotatably coupled to second link 6 about a second axis of rotation with sufficient rotational interference to hold the third link in a fixed position relative to the second link under a load from a peripheral device. Fourth link 10 may be rotatably coupled to third link 8 about a third axis of rotation with sufficient rotational interference to hold the fourth link in a fixed position relative to the third link under a load from a peripheral device. Weighted link 52 may be rotatably coupled to fourth link 10 about a fourth axis of rotation with sufficient rotational interference to hold the fourth link in a fixed position relative to the weighted link under a load from a peripheral device.

First link 4 may be configured with a mount 56 for mounting a peripheral electronic device, or virtually any other suitable device, to the first link. Although shown configured as a single through-hole capable of receiving and coupling an electronic device to first link 4, in other embodiments mount 56 may be configured as two through-holes, three through-holes or another suitable number of through-holes. In other embodiments, mount 56 may be configured as slot(s) or other suitably shaped orifice(s) capable of receiving and coupling a peripheral device thereto. In other embodiments, the mount may include a male tab that mates with a complementary female component on the peripheral device. It should be appreciated that although mount 56 is shown integral to first link 4, in other embodiments, second link 6, third link 8, fourth link 10, or weighted link 52 may additionally or alternatively have mounting features that may partially assist in or fully receive and couple a peripheral electronic device to skeleton 2.

Figure 3:
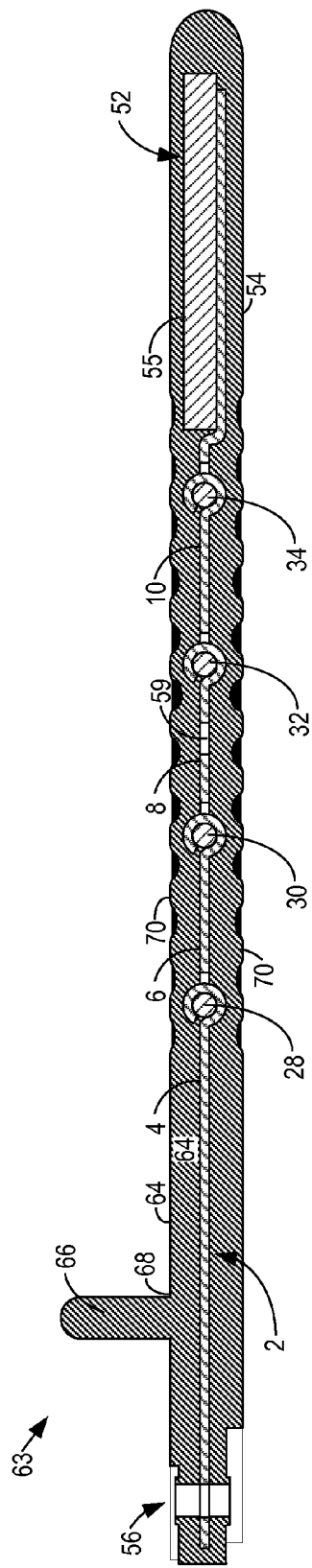
FIG. 3 shows a peripheral positioner including the skeleton of FIGS. 1 and 2 encapsulated in a flexible polymer membrane according to an embodiment of the present disclosure.

First link 4, second link 6, third link 8, and fourth link 10 may define through-holes 58 to allow a flexible polymer membrane encapsulating skeleton 2 to form a mechanical interlock therethrough (described in further detail with regard to FIG. 3). Each individual link may include virtually any number of through-holes, and any individual links may be configured with a different number of through-holes than other individual links. Some individual links may be configured without any through-holes.

Figure 2:
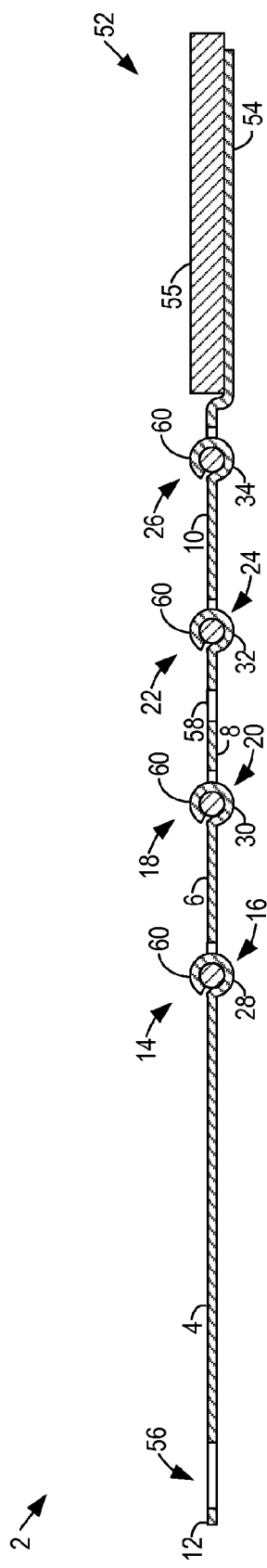
FIG. 2 shows the skeleton of FIG. 1 as a cross-sectional cut-away along line 2-2 according to an embodiment of the present disclosure.

FIG. 2 shows the skeleton of FIG. 1 as a cross-sectional cut-away along line 2-2. The ends of first link 4, second link 6, third link 8, fourth link 10, and weighted link 52 may include a curved portion 60 by which the link is coupled to one of the plurality of pins. An example of the relationship between a curved portion and the pin to which it is coupled is shown at second end 14 of first link 4, which includes a curved portion 60. Curved portion 60 of first link 4 may be formed around at least a portion of an outer perimeter of first pin 28. In some embodiments, curved portion 60 of first link 4 and first pin 28 may be configured to have a frictional interference fit that may create sufficient rotational interference to hold the first link in a fixed position relative to the second link, even when under a load from a peripheral device. Similarly, first end 16 of second link 6 may include a curved portion (not shown in FIG. 2) that may be formed around at least a portion of an outer perimeter of first pin 28.

In some embodiments, curved portion 60 of the first end of the second link and first pin 28 may be configured to have a frictional interference fit that may create sufficient rotational interference to hold the second link in a fixed position relative to the first link, even when under a load from a peripheral device. Furthermore, in other embodiments, one of the two links coupled to a specific pin may be substantially rigidly coupled to the pin while the remaining link may be rotatably coupled to the pin as described above.

Line 2-2 of FIG. 1 includes a jog that allows one of the plurality of through-holes 58 defined by the third link to be emphasized in FIG. 2. The through-hole defined by third link 8 may allow a flexible polymer membrane encapsulating skeleton 2 to form a mechanical interlock therethrough (described in further detail with regard to FIG. 3). Mount 56 is also emphasized in FIG. 2.

In some embodiments, the plurality of links and pins included by skeleton 2 may be constructed substantially of the same material, for example, stainless steel. In other embodiments, the plurality of links may be constructed of one material, while the plurality of pins are constructed of a different material. In other embodiments, adjacent links may be constructed from different materials. Similarly, in other embodiments, different pins may be constructed from different materials. Non-limiting examples of materials from which the plurality of links and/or the plurality of pins may be constructed, may include aluminum, various steel alloys, brass, various plastics, and various composite materials. Additionally, an individual link or pin may be constructed from more than one material.

FIG. 3 shows skeleton 2 encapsulated in a flexible polymer membrane 62. Flexible polymer membrane 62 may encapsulate first link 4, second link 6, third link 8, fourth link 10, weighted link 52, first pin 28, second pin 30, third pin 32, and fourth pin 34. Together, skeleton 2 and flexible polymer membrane 62 collectively constitute peripheral positioner 63.

Flexible polymer membrane 62 may include materials that possess favorable durability and wear properties such as silicone-based polymers, thermoplastic elastomers, and/or rubbers. Flexible polymer membrane 62 may provide peripheral positioner 63 with an outer surface that has adhesive surface properties that will help the peripheral positioner adhere to various objects with which it interacts.

Flexible polymer membrane 62 may also reduce the occurrence of scratches and/or abrasions to surfaces that the peripheral positioner may be in contact with. Furthermore, flexible polymer membrane 62 may provide the peripheral positioner with an outer surface that provides increased gripping properties for a user when manipulating the peripheral positioner into a desired configuration. The flexible polymer membrane also may protect the joints of the skeleton from dirt or debris that could negatively affect rotation. Also, the flexible polymer membrane may facilitate cleaning by providing a substantially continuous surface that can be easily wiped.

Flexible polymer membrane 62 may infiltrate through-holes 58 to join opposing sides of the flexible polymer membrane. A mechanical interlock 59 may thereby be formed between the opposing sides through each through-hole via the portion of the flexible polymer membrane infiltrating each through-hole. Each individual mechanical interlock may help to maintain an intimate contact relationship between skeleton 2 and flexible polymer membrane 62 that allows for the flexible polymer membrane to bend, stretch, and compress as skeleton 2 is manipulated into various arrangements.

The portion of flexible polymer membrane 62 encapsulating first link 4 may further include a substantially flat portion 64 and a positioning protrusion 66 that extends away from the substantially flat portion. The substantially flat portion and the positioning protrusion may collectively form an inside corner 68 that cooperates with another link of peripheral positioner 63 to pinch an object to which a peripheral electronic device is to be attached. In other embodiments, flexible polymer membrane 62 may include two, three or another suitable number of positioning protrusions. Additionally, in some embodiments, flexible polymer membrane 62 may include ridges 70 or other substantially non-flat surface features to allow for increased surface friction between the peripheral positioner and an object to which peripheral positioner 63 may be in contact, and/or to enhance handling characteristics of the peripheral positioner.

Figure 4:
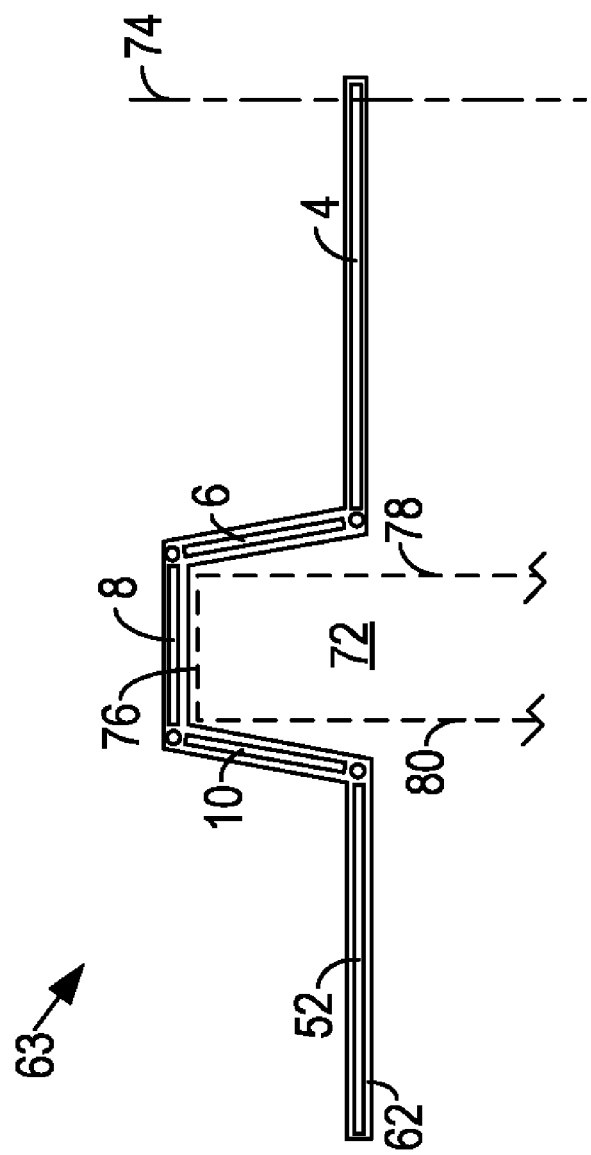
FIG. 4 schematically shows the peripheral positioner of FIG. 3 configured to pinch an object to which a peripheral electronic device is to be attached according to an embodiment of the present disclosure.

FIG. 4 schematically shows peripheral positioner 63, the links of the positioner configured to cooperate in pinching a display 72 to which a peripheral electronic device is to be attached. The plurality of links of the peripheral positioner may be configured to cooperate to pinch a display 72 (i.e. a desktop computer display or a laptop computer display). Additionally, mounting centerline 74 is shown to represent a relationship between a mounting axis of a peripheral electronic device and a mount (not shown in FIG. 3) defined by first link 4. For example, a mounting pin included by a peripheral electronic device may be placed through a through-hole defined by first link 4 along an axis substantially parallel to and substantially coincident with mounting centerline 74. The peripheral may thereby be rotatably coupled to first link 4. Furthermore, such a mounting configuration may allow for a peripheral electronic device mounted to first link 4 to rotate (i.e., "pan") about a rotation axis that is substantially parallel to mounting centerline 74. For example, in some embodiments, a web-cam mounted to first link 4 in such a manner may be able to pan through an angle range of 30° or more and thereby increase the number of viewing angles in which the web-cam may be arranged. The functionality of peripheral positioner 63 may thereby be enhanced.

Third link 8 may be positioned substantially on a top surface 76 of display 72. First link 4 and second link 6 straddle a front surface 78 of display 72 and fourth link 10 and weighted link 52 straddle a rear surface 80 of display 72. Thus, weighted link 52 may be positioned behind rear surface 80 of display 72 and first link 4 may be extended in front of front surface 78 of display 72. In other examples of similar pinching configurations, second link 6 and/or fourth link 10 may be arranged more parallel to or less parallel to a front surface and a rear surface of a display, respectively, to allow for a substantially static, balanced pinching configuration of peripheral positioner 63 about different displays with different dimensions.

Similarly, in other examples of such a pinching configuration, first link 4, and/or third link 8, and/or weighted link 52 may be arranged more parallel to or less parallel to top surface 76 of display 72, respectively, to allow for a substantially static, balanced pinching configuration of peripheral positioner 63 about different displays with different dimensions. In other words, the relative positioning of the first link, second link, third link, fourth link, and the weighted link may be arranged such that the center of gravity of peripheral positioner 63 and mounted peripheral electronic device is substantially directly below top surface 76 of display 72. As such, the links of peripheral positioner 63 may be manipulated to arrange peripheral positioner 63, with a peripheral electronic device mounted thereto, into a substantially static, balanced pinching configuration about display 72.

Figure 5:
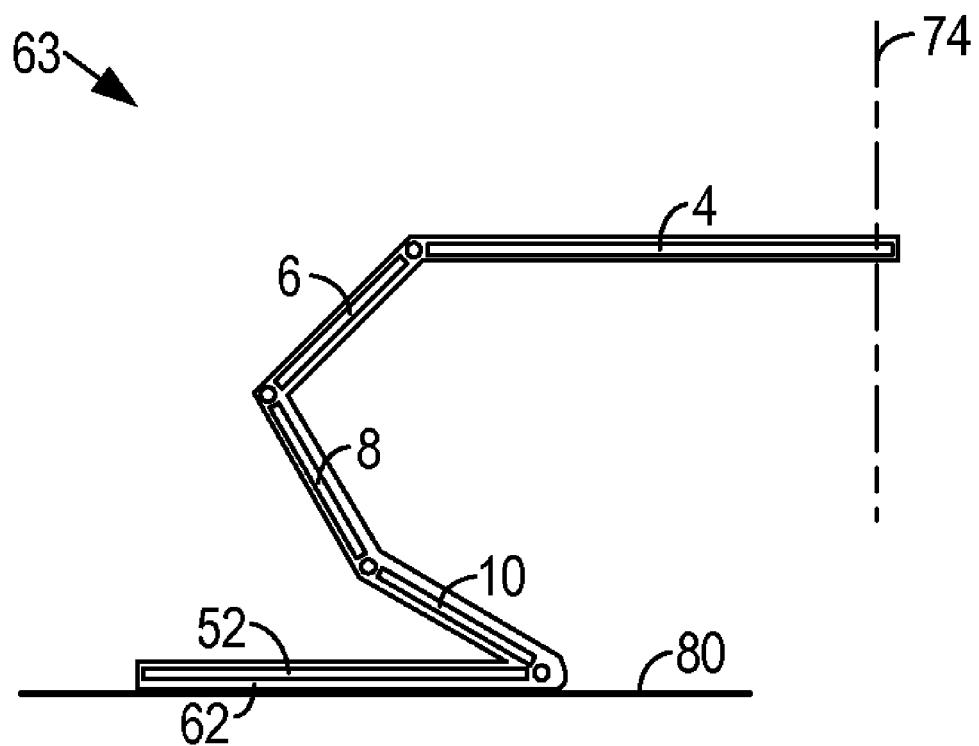
FIG. 5 schematically shows the peripheral positioner of FIG. 3 configured to maintain a C-shaped arrangement to support a peripheral electronic device above a surface on which the skeleton and flexible polymer membrane is resting according to an embodiment of the present disclosure.

FIG. 5 schematically shows peripheral positioner 63, the links of which are configured to maintain a C-shaped arrangement to support a peripheral electronic device above a resting surface 80 upon which a weighted link 52 is resting. Mounting centerline 74 is shown to represent a relationship between a mounting axis of a peripheral electronic device and a mount (not shown in FIG. 4) defined by first link 4. For example, a mounting pin included by a peripheral electronic device may be placed through a through-hole defined by first link 4 along an axis substantially parallel to mounting centerline 74. The peripheral electronic device may thereby be rotatably coupled to first link 4.

Weighted link 52, which may be configured to be heavier and/or wider than either the first, second, third, or fourth links, is shown as being substantially parallel to and resting upon resting surface 82. As a non-limiting example, weighted link 52 may be resting on the working surface of a desk upon which a desktop computer keyboard, monitor, and mouse may also be resting. First link 4, second link 6, third link 8, and fourth link 10 may be arranged relative to each other (and to weighted link 52) such that the first, second, third, and fourth links form a "C" shape. In other words, the relative positioning of the first link, second link, third link, fourth link, and weighted link may be arranged such that the center of gravity of peripheral positioner 63, with a peripheral electronic device mounted thereto, and configured to maintain a C-shape arrangement, is substantially directly above weighted link 52. As such, the links of peripheral positioner 63 may be manipulated to arrange peripheral positioner 63, with peripheral electronic device mounted thereto, into a substantially static, balanced C-shaped arrangement that may support a peripheral electronic device above resting surface 82 upon which weighted link 52 is resting.

Figure 6:
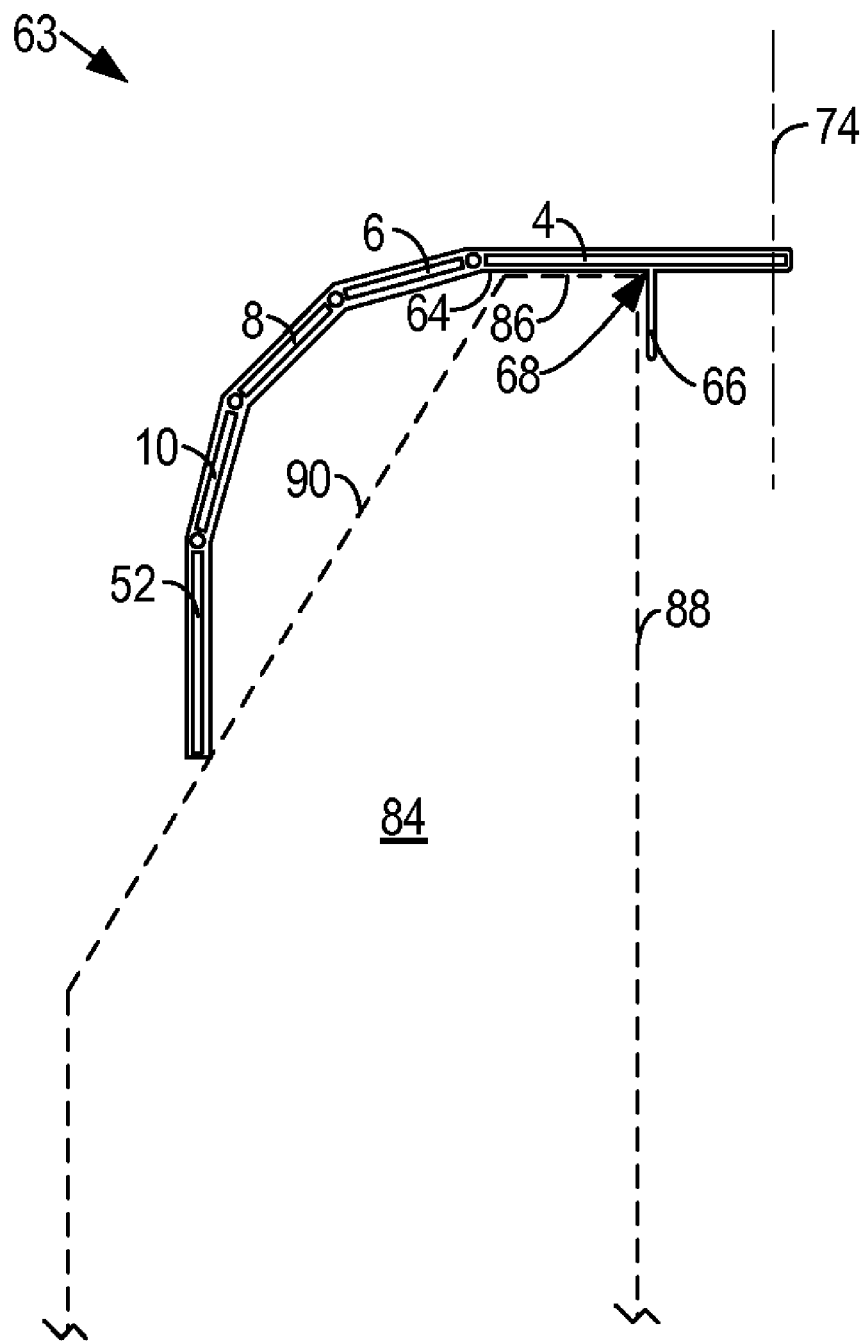
FIG. 6 schematically shows the skeleton of FIG. 1, encapsulated in a flexible polymer membrane that includes a substantially flat portion and a positioning protrusion, pinching an object to which a peripheral electronic device is to be attached according to an embodiment of the present disclosure.

FIG. 6 schematically shows peripheral positioner 63 configured to pinch a display 84. Flexible polymer membrane 62 may include a substantially flat portion 64 and a positioning protrusion 66 extending away from the substantially flat portion. Substantially flat portion 64 and the positioning protrusion 66 may collectively form an inside corner 68 that cooperates with another link of peripheral positioner 63 to pinch an object to which a peripheral electronic device is to be attached. As illustrated, peripheral positioner 63 is configured to pinch display 84 (i.e., a computer monitor display). In other embodiments, peripheral positioner 63 may be configured to pinch other objects to which a peripheral is to be attached, such as a corner of a desktop, an edge of a shelf, or virtually any other suitable object.

Inside corner 68 and weighted link 52 are cooperating to pinch display 84. First link 4 may be arranged to rest upon a top surface 86 of display surface 84 and extend in front of a front surface 88 of display 84. Inside corner 68 may be arranged to substantially contact a corner formed by top surface 86 and front surface 88 of display 84. Second link 6, third link 8, fourth link 10 and weighted link 52 may be positioned substantially over a rear surface 90 of display 84, with a portion of the weighted link contacting the rear surface of the display.

In other pinching configurations of peripheral positioner 63, a portion of second link 6, and/or a portion third link 8, and/or a portion of fourth link 10 may be arranged to contact rear surface 90 of display 84. Correspondingly, in other configurations of peripheral positioner 63, weighted link 52 (i.e., the portion of flexible polymer membrane encapsulating weighted link 52), may not be in contact with display 84. Thus, in other embodiments, to accommodate other object geometries and dimensions and/or the weight of different peripheral electronic devices, peripheral positioner 63 may be configured such that only a single link or multiple links cooperate with inside corner 68 to effectively pinch the object and allow for a substantially static, balanced pinching configuration of peripheral positioner 63.

Figure 7:
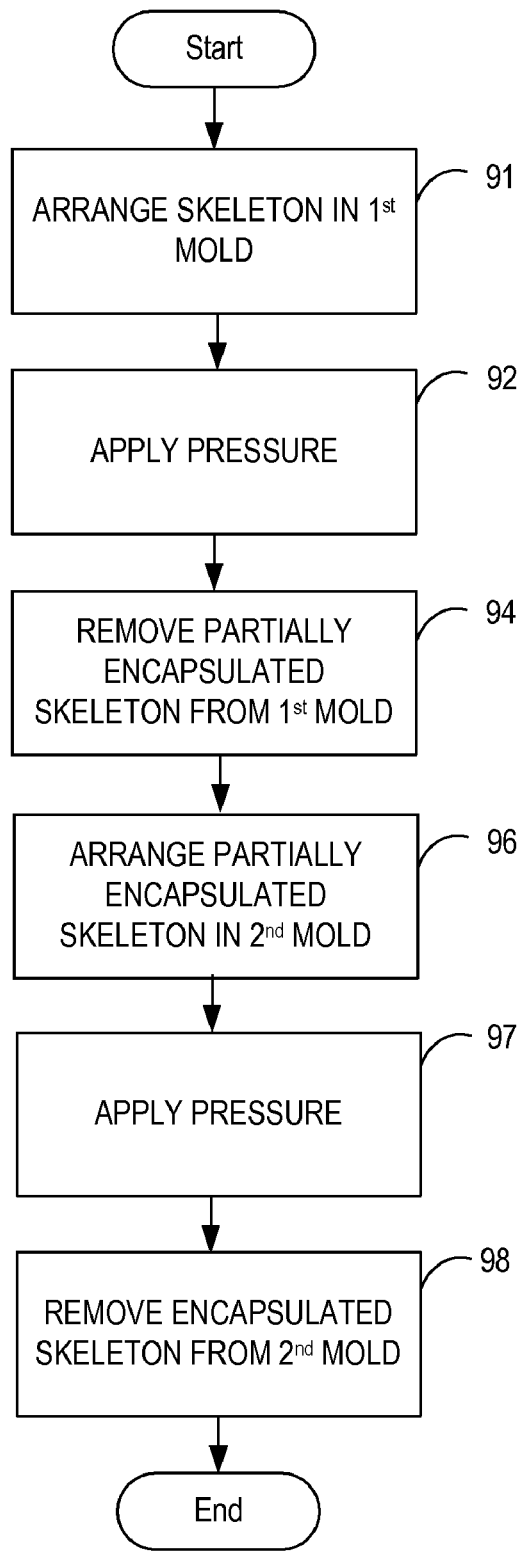
FIG. 7 shows a process flow of a method for encapsulating the skeleton of FIG. 1 in a flexible polymer membrane according to an embodiment of the present disclosure.

FIG. 7 shows a process flow of a method for encapsulating an articulating skeleton, such as skeleton 2 of FIG. 1, in a flexible polymer membrane. As non-limiting examples, the flexible polymer membrane may include silicone-based polymer(s), thermoplastic elastomers(s), and/or rubber(s). At 91, a skeleton, including a plurality of links and a plurality of pins, may be inserted into a first mold section of a first mold that has one or more polymer strips laid over a mold cavity integral to the first section of the first mold. In other words, a first side of the skeleton (i.e., a substantially flat side) may be laid on top of the polymer strips overlaying the cavity defined by the first mold section of the first mold.

At 92, a second mold section of the first mold may be positioned over the skeleton, the polymer strips, and the first mold section of the first mold, and a compressive force may then be applied to the first mold section of the first mold and/or to the second mold section of the first mold. The compressive force may thereby cause the polymer strips to become less viscous and to flow throughout the mold cavity defined by the first mold section of the first mold. The first side of the skeleton may thereby by encapsulated by a flexible polymer membrane. Additionally, at 92, a portion of the polymer strips, by virtue of the compressive force applied to at least one of the mold sections, may be caused to become less viscous and infiltrate at least a portion of one or more through-holes defined by the plurality of links.

At 94, the partially encapsulated skeleton may be removed from the first mold section of the first mold and the second mold section of the first mold. At 96, the partially encapsulated skeleton may be inserted into a first mold section of a second mold that has one or more polymer strips laid over a mold cavity integral to the first mold section of the second mold. Thus, a second side of the skeleton (i.e., a substantially flat side, opposite the partially encapsulated side of the skeleton) may be laid on top of the polymer strips overlaying the mold cavity defined by the first mold section of the second mold.

At 97, a second mold section of the second mold may be placed over the skeleton, the polymer strips, and the first mold section of the second mold and a compressive force may then be applied to the first mold section of the second mold or to the second mold section of the second mold, or to both the first mold section of the second mold and the second mold section of the second mold. The compressive force may thereby cause the polymer strips to become less viscous and to flow throughout the mold cavity defined by the first mold section of the second mold. The second side of the skeleton may thereby be encapsulated in a flexible polymer membrane. Furthermore, at 97, the flexible polymer membrane encapsulating the first side of the skeleton may be joined with the flexible polymer membrane encapsulating the second side of the skeleton along the outer perimeter of the skeleton. The skeleton may thus be fully encapsulated by a single flexible polymer membrane.

Additionally, at 97, the polymer strips, by virtue of the compressive force applied to at least one of the mold sections, may be caused to infiltrate one or more of the through-holes defined by each of the plurality of links integral to the skeleton. A mechanical interlock may thereby be formed through each through-hole as the portion of the flexible polymer membrane encapsulating the first side of the skeleton and the portion of the flexible polymer membrane encapsulating the second side of the skeleton are joined. As previously discussed, each individual mechanical interlock may help to maintain an intimate contact relationship between the skeleton and the flexible polymer membrane that allows for the flexible polymer membrane to bend, stretch, and compress as the skeleton is manipulated into various arrangements. At 98, the skeleton, now fully encapsulated in the flexible polymer membrane, may be removed from the first mold section of the second mold and the second mold section of the second mold.

It should be appreciated that in some embodiments of the method described herein, the first mold and the second mold may be the same mold. In other embodiments, the first mold may be different from the second mold. Furthermore, in other embodiments, the second mold may be a completely separate, individual mold, but may be substantially identical to the first mold. In yet other embodiments, the first mold section of the first mold may be used as the first mold section of the second mold and the second mold section of the first mold may be used as the second mold section of the second mold.

Figure 8:
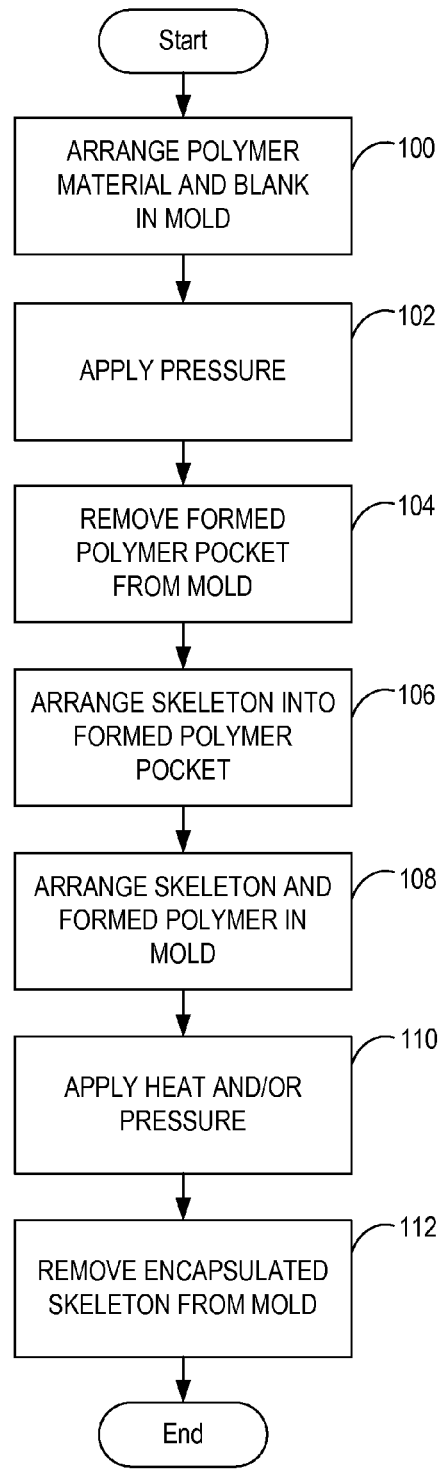
FIG. 8 shows a process flow of a method for encapsulating the skeleton of FIG. 1 in a flexible polymer membrane according to an embodiment of the present disclosure.

FIG. 8 shows a process flow of a method for encapsulating an articulating skeleton, such as skeleton 2 of FIG. 1, in a flexible polymer membrane. As non-limiting examples, the flexible polymer membrane may include silicone-based polymer(s), thermoplastic elastomers(s), and/or rubber(s), At 100, the flexible polymer may be set up for premolding. Premolding setup may include arranging one or more polymer strips over a first mold section. A middle mold section may then be laid over the polymer strips. The second mold section may be configured to generally approximate the shape and dimensions of the skeleton. One or more polymer strips may then be laid over the middle mold section and a third mold section may then be arranged over the first mold section, the first polymer strip(s), the middle mold section, and the second polymer strip(s).

At 102, a compressive force may then be applied to the first mold section or to the second mold section, or to both the first mold section and the second mold section. The compressive force may thereby cause the polymer strips to become less viscous and to flow throughout the mold. A polymer pocket approximating the shape and dimensions of the skeleton may thereby be formed around the middle mold section (also referred to as a blank).

At 104, a formed polymer pocket may be removed from the first mold section, the middle mold section, and the second mold section. At 106, the skeleton may be placed into the formed polymer pocket. At 108, the skeleton, arranged inside the formed polymer pocket, may be placed in between the first mold section and the second mold section. At 110, the first mold section, second mold section, and the skeleton arranged inside the formed polymer pocket may be heated for a period of time—approximately 400 seconds as a nonlimiting example. The formed polymer pocket may thereby become less viscous and may flow around the skeleton to form closer, more intimate contact relationships with the surfaces of the skeleton. Furthermore, the polymer pocket may effectively seal around the skeleton. At 112, the encapsulated skeleton can be removed from the mold.

In some embodiments, portions of the formed polymer pocket, by virtue of the heating process, may be caused to infiltrate one or more through-holes defined by each of the plurality of links integral to the skeleton. A mechanical interlock may thereby be formed through each through-hole as the portion of the flexible polymer membrane encapsulating a first, substantially flat side of the skeleton and the portion of the flexible polymer membrane encapsulating a second, substantially flat side of the skeleton are joined.

It should be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A peripheral positioner, comprising:
   a first link having a first end, a second end, and a mount for a peripheral device, the mount defining a through-hole;
   a second link having a first end and a second end;
   a third link having a first end and a second end;
   a first pin having a longitudinal axis, the first pin rotatably coupling the second end of the first link to the first end of the second link such that a rotation axis of the first link and the second link is substantially parallel to the longitudinal axis of the first pin;
   a second pin having a longitudinal axis, the second pin rotatably coupling the second end of the second link to the first end of the third link such that a rotation axis of the second link and the third link is substantially parallel to the longitudinal axis of the second pin, the rotation axis of the first link, and the longitudinal axis of the first pin;
   a weighted link heavier than either the first link, the second link, or the third link, the weighted link rotatably coupled to the third link or a series of one or more intermediate links rotatably coupled to the third link; and
   a flexible polymer membrane fully encapsulating the first link, the second link, the third link, the weighted link, the first pin, and the second pin while leaving the through-hole open, the flexible polymer membrane seamlessly extending through and around an entire inner surface of the mount defining the through hole, the flexible polymer membrane including a positioning protrusion extending away from the first link;
   the peripheral positioner adjustable between a tabletop mounting configuration where at least the first link, the second link, the third link, and the weighted link are configured to maintain a C-shaped arrangement to support a peripheral device above a surface on which the weighted link is resting and a display mounting configuration where the positioning protrusion catches a top front edge of a display while the weighted link extends behind the display to support the peripheral device on top of the display.

2. The peripheral positioner of claim 1, where one or more of the first link, the second link, and the third link defines one or more through-holes, and where the flexible polymer membrane infiltrates the through-holes to join opposing sides of the flexible polymer membrane.

3. The peripheral positioner of claim 1, wherein an interface between the first link, the second link, and the first pin has sufficient rotational interference to hold the second link in a fixed position relative to the first link under a load from a peripheral device.

4. The peripheral positioner of claim 1, where at least the first link, the second link, the third link, and the weighted link are configured to maintain a pinching arrangement to attach a peripheral device to a display behind which the weighted link is positioned and in front of which the first link extends.

5. The peripheral positioner of claim 1, where the flexible polymer membrane includes a substantially flat portion and where the positioning protrusion extends away from the substantially flat portion, the substantially flat portion and the positioning protrusion collectively forming an inside corner adjacent to the first link that cooperates with another link of the peripheral positioner to pinch an object to which a peripheral device is to be attached.

* * * * *